Dec. 13, 1966   MITSUMASA AYUZAWA ET AL   3,290,762
METHOD OF MANUFACTURING FLEXIBLE WAVEGUIDE

INVENTORS
MITSUMASA AYUZAWA,
SUMIO SAWADA &
BY TORU SHIBUKAWA
WILLIAM D. CAROTHERS
THEIR ATTORNEY

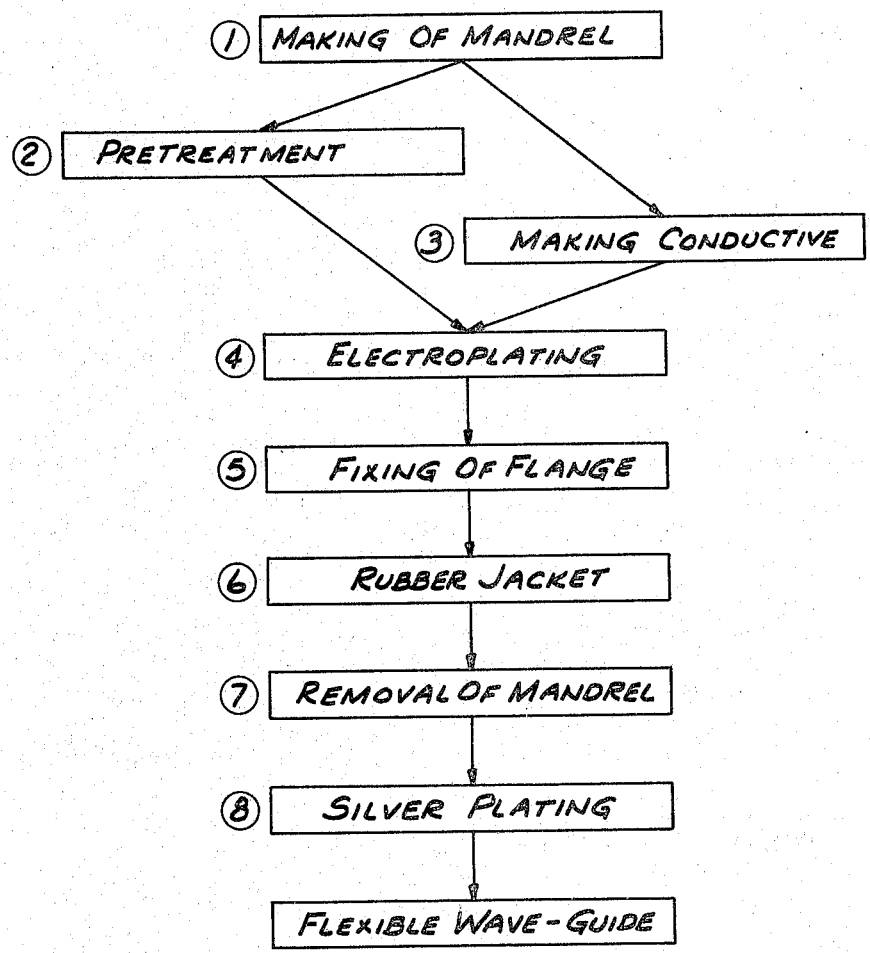

United States Patent Office 3,290,762
Patented Dec. 13, 1966

3,290,762
METHOD OF MANUFACTURING FLEXIBLE WAVEGUIDE
Mitsumasa Ayuzawa and Sumio Sawada, Nishinomiya-shi, and Toru Shibukawa, Nara-shi, Japan, assignors to Sumitomo Electric Industries, Ltd., Osaka, Japan, a corporation of Japan
Filed Sept. 11, 1964, Ser. No. 395,837
4 Claims. (Cl. 29—155.5)

The present invention relates to a method of manufacturing a flexible waveguide by the electroforming technique.

Present methods of manufacturing rectangular or circular flexible waveguides, have hitherto been of the interlock type, and of the bellows type which is made of metal plate, and that of the wire net type.

The method of manufacturing the interlock type consists in the following steps: Brass tapes are wound around a mandrel which has the requisite cross section, adjacent turns are bent so as to interlock in each other. An interlocked flexible tube of brass tape is gradually built up in this manner, and its interior is plated with silver. The outside of this flexible tube is covered with a rubber jacket for the purpose of protection, and connecting flanges are provided on the opposite ends of this flexible tube.

This interlock type has a high electric resistance in the axial direction, because the adjacent turns are attached together merely by interlocking and the contact resistance of the interlocked joints of the connected tapes is added. Again, the inner and outer interlocked parts are not completely shielded, so that a part of electro-magnetic wave may leak away. Furthermore, the process of winding brass tapes while interlocking them is of an exceedingly difficult technique, and the cost of the product is found high. Moreover, it is difficult to manufacture a product of a high precision, and it is almost impossible to manufacture the flexible waveguide having a small cross sectional area.

The manufacture of bellows type by machining processes is carried out in the following way: First, a brass plate is given corrugations with a fixed interval and then bent to make a flexible waveguide of the requisite rectangular or circular shape. Here also, there may take place variations in the dimensions due to the seam of soldering at the joint of plate and the tube may get deformed owing to pressure at the time when the rubber jacket is put on in a subsequent process. It is thus impossible to maintain high precision of requisite dimensions, resulting in poor electric characteristics especially in the V.S.W.R. (Voltage Standing Wave Ratio).

Besides those mentioned above, there are waveguides made of wire nets. However, the waveguide of the wire net type has poor transmission characteristics because the direct current resistance of the tube wall is high and the leakage of electromagnetic wave takes place and moreover the wire net type waveguide gets deformed easily when bent.

The present invention furnishes a method of manufacturing a seamless bellows type flexible waveguide which is free from these drawbacks.

The object of the present invention is to supply a method of manufacturing seamless bellows-type flexible waveguides free from such defects by the electroforming technique using a mandrel.

The object of the present invention is to supply a method of manufacturing by the electroforming technique flexible waveguides which have a small cross sectional area, which are of high precision and which have good electromagnetic wave transmission characteristics.

The object of the present invention is to supply a method of manufacturing flexible waveguides of high precision, in which a mandrel is used, flanges are installed at the ends and a rubber jacket is placed on a waveguide tube which is made to the requisite thickness by electroplating on the surface of that mandrel, and then the mandrel is removed, thereby preventing the product from the deformation of the shape during these processes. The object of the present invention is to supply a method of manufacturing a flexible waveguide which has a great mechanical strength for repetition of bending.

The object of the present invention is to supply a method of manufacturing flexible wave guide which makes use of the technique of electroplating on a mandrel and which is suitable for mass production.

Other objects and advantages appear hereinafter in the following description and claims. The accompanying drawings show for the purpose of exemplification without limiting the invention or claims thereto, certain practical embodiments illustrating the principles of this invention wherein:

FIG. 4 is a diagrammatic view illustrating the method comprising this invention.

FIG. 5 is a series of sectional views illustrating the corresponding steps of the flow diagram of FIGURE 4.

Figures 1, 2, 3:
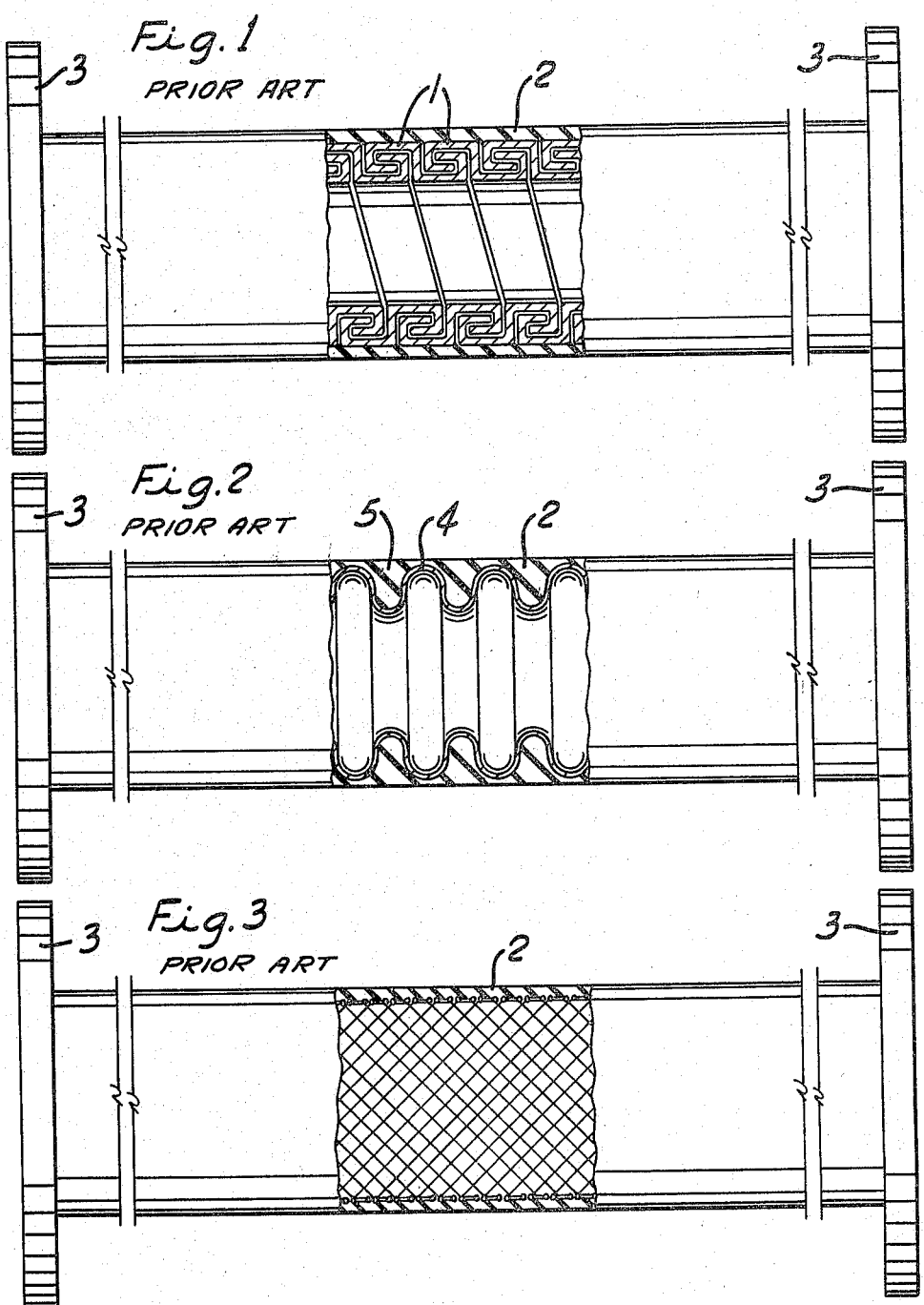
FIG. 1 is a plan view partially in section of a flexible wave guide wound with interlocking tape.
FIG. 2 is a plan view partially in section showing a flexible wave guide made of corrugated brass plate, the seams of which are connected by soldering.
FIG. 3 is a plan view partially in section of a flexible wave guide constructed of wire net.
Figure 5A:
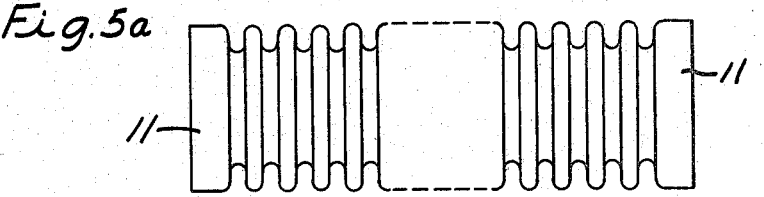
FIG. 5(a) illustrates the mandrel prepared for electroplating.
Figure 5B:
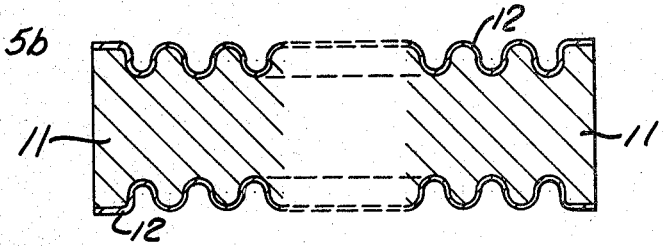
FIG. 5(b) illustrates the mandrel after having been electroplated.
Figure 5C:
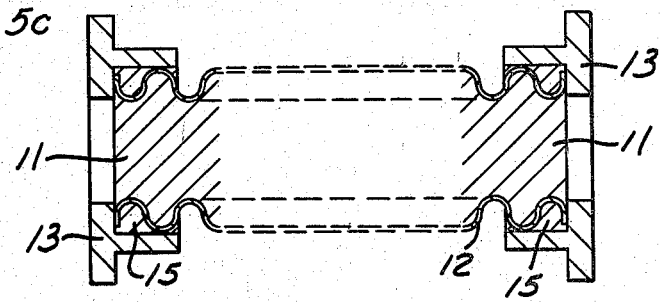
FIG. 5(c) illustrates the electroplate connecting flanges connected to the ends of the electroplate.
Figure 5D:
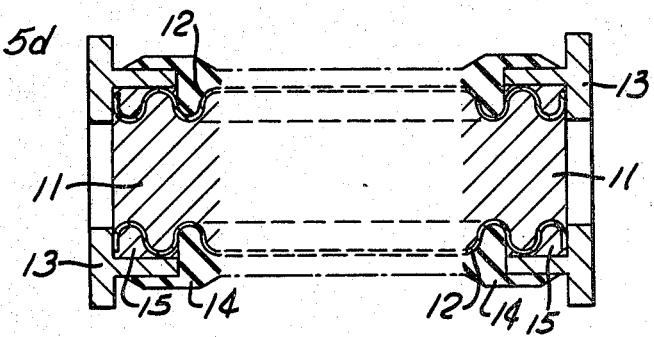
FIG. 5(d) is a plan view partially in section showing the secured coaxial portions of the connecting flanges in the exterior of the electroplate covered and joined by an elastomer.
Figure 5E:
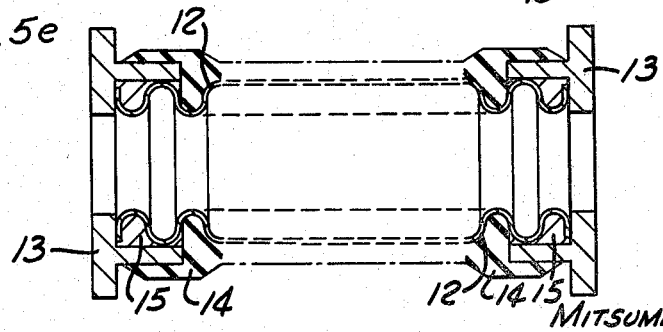
FIG. 5(e) is a plan view partially in section showing the finished seamless bellows flexible type wave guide with a mandrel removed and comprising this invention.

FIGURE 1 shows the flexible wave guide of the interlock type which has hitherto been manufactured. FIGURE 2 shows the flexible waveguide of the bellows-type which has been made by mechanical forming of metal plate. FIGURE 3 shows the flexible wave guide of the wire net type. FIGURE 4 is a diagram of the manufacturing processes of the present invention. FIGURE 5 shows the shape of the product relating to each principal step in the process of manufacturing the flexible seamless wave guide comprising this invention. FIGURE 5(a) shows the mandrel produced from step 1. FIGURE 5(b) shows the section view of the mandrel 11 and flexible waveguide 12 which is electroplated on mandrel by the step 4. 11 is the mandrel. 12 is the flexible waveguide produced by the electroplating casting. FIGURE 5(c) shows the section view of the flange fixed to the waveguide without removing the mandrel after step 5. 13 is the flange. FIGURE 5(d) shows a section view of the waveguide covered with a rubber jacket 14 without removing the mandrel after step 6. 14 is the rubber jacket. FIGURE 5(e) shows the section view of the finished waveguide from which the mandrel has been removed by step 7.

Referring to the FIGURES 4 and 5, I will explain in detail the method of manufacturing flexible waveguides by the electroforming technique of the present invention.

FIGURE 4 is a diagram of the steps in this manufacturing method:

1—the making of the mandrel, 2—pretreatment for the electroforming, 3—treatment to render the surface of the mandrel electro-conductive when the mandrel is non-conductive, 4—electroplating, 5—fixing of flanges, 6—covering with a rubber jacket, 7—removal of the mandrel, 8—silver plating.

1. Manufacture of the mandrel:

As the material for the mandrel 11, aluminum, zinc, methyl-meta-acryl resin, polycarbonate resin and low melting allows are used.

The mandrel for flexible waveguides is manufactured by the die-cast technique if the material used is aluminum, zinc or low melting alloys, and by the injection moulding technique if it is made of a resin. A section along the axis of the mandrel 11 is shown in FIGURE 5(b). If the method of the present invention is used, a mandrel having a high accuracy in dimensions and a smooth surface can be made without difficulty. This method makes the manufacturing cost low and is suitable for mass production.

It is also possible to obtain a good quality mandrel by mechanical forming where aluminum is used and by pressure casting or ordinary casting where resin or a low melting alloy is used.

2. Treatment of the surface of the mandrel:

When the material used for making the mandrel is a metal, the mandrel obtained in the above-described way is given a surface treatment to make it suitable for plating.

3. Making the mandrel conductive:

In case the material used for making the mandrel is a non-electroconductive material, a metallic film is produced on the surface of the mandrel by electroless plating or silver mirror reaction or a conductive coating material is applied to the surface in order to render the surface of the mandrel electro-conductve. After such treatment, it is transferred to the plating process.

4. Electroplating:

In this process, copper or copper alloys, such as copper-tin, copper-zinc, etc. having a thickness not exceeding 0.02 in. (0.5 mm.) is deposited on the surface of the mandrel by electroplating. The uniformity of thickness throughout the whole layer of the deposited metal is most important to obtain a flexible waveguide with good mechanical characteristics. Consequently, a simple salt bath is not suitable as the electroplating bath. A complex salt bath is therefore used with the addition of additives to improve the uniformity of the deposited layer. In order to improve the uniformity still further, the mandrel is rotated during plating and the so-called periodic reverse current method is often adopted. The periodic reverse current method not only improves the uniformity of the plated layer but also has the advantages of eliminating pin holes and increasing the plating current density.

Usually, the plating process is completed in 1–3 hours, with a current density of 3–5 a./dm.$^2$.

5. Fixing of flanges:

After a metallic layer 12 of the prescribed thickness is formed on the mandrel 11 by electroplating, flanges 13 are fixed with solder 15 at both ends of the formed waveguide 12 without removing the mandrel when the mandrel material is aluminum, aluminum alloy, zinc or zinc alloy. As the waveguide is manufactured in a condition wherein it is filled with a mandrel, no deformation due to mechanical handling takes place. Therefore flanges can be fixed to it with a very high precision. FIGURE 5(c) shows a section of the flange 13 fixed to the waveguide 12 with the mandrel unremoved.

6. Rubber jacket covering:

When the material for the mandrel is aluminum, aluminum alloy, zinc or zinc alloy, flanges are fixed at both ends of the mandrel having the electroplated metal layer without removing the mandrel material after the completion of the electroplating and then the rubber jacket 14 for the protection of the waveguide is installed. When installing this rubber jacket 14, generally pressure is placed upon the waveguide. If the waveguide is hollow, it will have a deformation of shape and causes deterioration of the electric characteristics. If the present method is adopted, however, the waveguide is subjected to the rubber mould process while it is in the condition of having the mandrel in it. It is consequently possible to cover it with a rubber jacket, allowing no deformation to take place and maintaining a high precision. A section of the waveguide covered with a rubber jacket without removing the mandrel is shown in FIGURE 5(d).

7. Removal of mandrel:

In case the material used for the mandrel 11 is aluminum, aluminum alloy, zinc or zinc alloy, the mandrel is removed after the fixing of flanges 13 and covering of a rubber jacket 14 are completed. The method of removing the mandrel varies according to the material used for the mandrel. For example, if the material is aluminum, it is soaked in a solution of caustic soda of a 20–30% concentration heated to 80–100° C. If it is zinc, it can be dissolved and removed by soaking in hydrochloric acid of a concentration of 25% or more.

A section of the finished flexible waveguide from which the mandrel has been removed is shown in FIGURE 5(e).

In case the material for the mandrel is a resin or a low melting alloy, it is not appropriate to fix flanges and install the rubber jacket before removal of the mandrel. When the mandrel is made of this kind of a material, flanges are fixed after removal of the mandrel. That is to say, the mandrel of a resin or a low melting alloy can be used only when the flexible waveguides needs no rubber jacket.

8. Silver plating:

The inner surface of the flexible waveguide from which the mandrel has been removed and the flanges are silver-plated to a thickness of approximately 0.1 mil to finish them.

Flexible waveguides having a very high precision in dimensions are manufactured by the above-mentioned method. As the waveguide is not made of metal tapes or wire nets, it is free from electromagnetic wave leakage and has very good transmission characteristics in various bent conditions for use. As is shown in the tables 1 and 2, which show measuring results of the electrical properties of products of the present method, their V.S.W.R.'s are 1.1 or less.

The waveguide obtained by this manufacturing method has a great mechanical strength for bending and, as shown in the example of application, shows almost no change after bending 50,000 times. It has a long life.

The product obtained by this method is highly flexible and can be bent as freely as a coaxial cable.

An example of the application of this manufacturing method is given below.

A mandrel, having a corrugated surface, designed for the 7,000 mc. band or 10,000 mc. band, makes use of zinc for die-casting. The surface of the mandrel is degreased with trichloroethylene and then oxides on the surface are removed by immersion in a solution of diluted tartaric acid. After this, copper flashing is done over the surface of the mandrel and then copper plating.

In order to improve the uniformity of the plating, a high speed cyanide bath was used with the addition of additives. During the electroplating, the mandrel was rotated at 60 r.p.m. in the solution having air agitation.

The electroplating wherein the periodic reverse current method was adopted has a recurrent wave form in which the potential of the mandrel remains negative for 15 seconds and then positive for 2 seconds. The current density was 3a./dm.$^2$ and the plating lasted for 2 hours and 10 minutes. In this way a layer of copper having a thickness of approximately 0.006 in. (0.15 mm.) was obtained on the surface of the mandrel. After that, both ends were cut off and flanges were soldered at the prescribed positions. Then, neoprene rubber was moulded and vulcanized. The mandrel was then removed by immersion in a hydrochloric acid solution of 30% concentration. After removal of the mandrel, the inside of the tube was silver-plated to a thickness of 0.1 mil.

Regarding flexible waveguides of one foot length for the 7,000 mc. band and for the 10,000 mc. band manufactured in the above-described way, electric characteristics in various conditions were measured and the results are shown in Tables 1 and 2, wherein the V.S.W.R. stands for the Voltage Standing-Wave Ratio which is the ratio of the maximum voltage amplitude to the minimum voltage amplitude and wherein 1 gc. equals 1 gigacycle or 1,000 mc.

Table 1

| Waveguide type | Flexure direction | Flexure radius or Flexure angle | V.S.W.R. |
|---|---|---|---|
| For 7 G C. band | E plane Flexure | 50 mm | 1.01–1.03 |
|  | H plane Flexure | 100 mm | 1.01–1.03 |
|  | E plane Flexture (50,000 times). | 45°/ft | 1.01–1.03 |
| For 10 G C. band | E plane Flexure | 30 mm | 1.01–1.05 |
|  | H plane Flexure | 60 mm | 1.01–1.05 |
|  | E plane Flexure (50,000 times). | 60°/ft | 1.01–1.05 |

Table 2

| Waveguide type | Attenuation of IEC Spec., db/ft. | Measuring Frequency | Attenuation, db/ft. | Measuring Frequency, gc. |
|---|---|---|---|---|
| For 7 gc. band | 0.049 | At lowest frequency. | 0.049 | 5.85 |
| For 7 gc. band | 0.037 | At highest frequency. | 0.037 | 8.2 |
| For 10 gc. band | 0.11 | At lowest frequency. | 0.11 | 5.8 |
| For 10 gc. band | 0.065 | At highest frequency. | 0.06 | 16.0 |

We claim:
1. The method of manufacturing a seamless bellows type flexible wave guide comprising the steps of providing a transversely corrugated disposable mandrel with an electroconductive surface, electroplating the corrugated exterior of the mandrel, providing a pair of connecting flanges with coaxial portions to engage the electroplating at each end of the mandrel, securing the coaxial portion of each connecting flange to the opposite ends of the electroplate, molding a continuous tightly adhering elastomer coating around and joining each coaxial flange portion and the intermediate corrugated electroplate and removing the disposable corrugated mandrel from the interior of the corrugated electroplate to flexibly suspend the same between the elastomer connected flanges.

2. The method of claim 1 which also includes the step of rotating the mandrel during the step of electroplating the exterior surface thereof.

3. The method of claim 1 which also includes the step of applying pressure to the elastomer when molding by vulcanizing the same on the coaxial portions of the connecting flanges and the corrugations of the electroplate and which pressure is opposed by the mandrel.

4. The method of claim 1 which also includes the step of plating the exposed interior of the corrugated electroplate with a metal of high conductivity.

References Cited by the Examiner

UNITED STATES PATENTS 2,592,614 4/1952 Stoddard.
2,785,382 3/1957 Lamb _____ 333—95
2,870,524 1/1959 Kinnear _____ 204—9 X

OTHER REFERENCES

Journal of Brit. I.R.E., February 1961, page 173.

JOHN F. CAMPBELL, *Primary Examiner.*

WILLIAM I. BROOKS, *Examiner.*